(12) United States Patent
Cantrill (10) Patent No.: US 8,005,794 B2
(45) Date of Patent: Aug. 23, 2011

(54) MECHANISM FOR DATA AGGREGATION IN A TRACING FRAMEWORK

(75) Inventor: Bryan M. Cantrill, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 475 days.

(21) Appl. No.: 12/166,196

(22) Filed: Jul. 1, 2008

(65) Prior Publication Data

US 2008/0263044 A1    Oct. 23, 2008

Related U.S. Application Data

(63) Continuation of application No. 10/699,062, filed on Oct. 31, 2003, now abandoned.

(51) Int. Cl.
*G06F 17/30* (2006.01)
(52) U.S. Cl. .............................. 707/642; 707/662
(58) Field of Classification Search ............... 707/642, 707/662
See application file for complete search history.

(56) References Cited

U.S. PATENT DOCUMENTS

| 5,511,190 A * | 4/1996 | Sharma et al. ............................. 1/1 |
| 6,493,837 B1 * | 12/2002 | Pang et al. ............................ 714/45 |
| 2003/0159132 A1 * | 8/2003 | Barnett et al. ..................... 717/124 |
| 2004/0049641 A1 * | 3/2004 | So et al. ............................ 711/137 |

* cited by examiner

*Primary Examiner* — Jean B. Fleurantin
*Assistant Examiner* — Dennis Myint
(74) *Attorney, Agent, or Firm* — Osha•Liang LLP (57) ABSTRACT

A method is disclosed for obtaining data from a kernel, including obtaining data from the kernel, and storing the data in a data set an aggregation buffer using an aggregation function. A method is disclosed for storing data in a data set, wherein the data set includes a key component, an aggregation identifier component, and a value component, including obtaining an expression, a new value, and an aggregation identifier, generating a key using the expression and the aggregation identifier; and storing the data set in a buffer, wherein storing the data set comprises storing the key in the key component, storing the aggregation identifier in the aggregation identifier component, and updating a current value in the value component using the new value and an aggregation function.

17 Claims, 9 Drawing Sheets

MECHANISM FOR DATA AGGREGATION IN A TRACING FRAMEWORK

CROSS REFERENCE TO RELATED APPLICATIONS

This application is a continuation of U.S. patent application Ser. No. 10/699,062, filed Oct. 31, 2003 now abandoned, and entitled "Mechanism for Data Aggregation in a Tracing Framework," in the name of Bryan M. Cantrill.

BACKGROUND

Analyzing the dynamic behavior and performance of a complex software system is difficult. Typically, analysis of a software system is achieved by gathering data at each system call and post-processing the data. The following is a brief description of conventional tracing frameworks.

The conventional tracing frameworks were typically composed of various independent software modules. The primary source of information accessed by the conventional tracing frameworks is the kernel. The conventional tracing frameworks typically include a trace facility, a trace module, a daemon, and an offline data analysis and processing component. The trace facility gathers information from various components of the kernel and forwards events to the trace module. The trace module subsequently logs the events in its buffer. Periodically, the trace daemon reads the events from the trace module buffer and commits the recorded events into a user-provided file.

The trace facility is an extension to the core kernel facilities. The trace facility provides a unique entry point to all of the other kernel facilities requesting or requiring that an event be traced. Such events are not logged, but instead, the trace request is forwarded to the trace module. If the trace module is compiled as part of the kernel, then the trace module achieves this functionality by registering itself with the trace facility upon system startup. Otherwise, if the trace module is compiled and loaded as a separate module, then the registration takes place when the trace module is loaded.

During the registration process, the trace module provides the trace facility with a call-back function that is called whenever an event occurs. If no trace module is registered, then the traced events are ignored. Furthermore, the registration process provides the trace module with the ability to configure the manner in which the instruction pointer values are recorded upon the occurrence of a system call. Once configured, the kernel browses the stack to find an instruction pointer matching the desired constraints, whenever a system call occurs. In summary, the kernel trace facility acts as a link between the trace module and the different kernel facilities.

The trace module stores the incoming event descriptions and delivers them efficiently to the daemon. More specifically, the trace module retrieves additional information for each event occurring in the kernel. This additional information includes the time at which the event occurred and the CPU identifier for the event. To efficiently deal with the large quantity of data stored by the trace module, the trace module typically uses a double-buffering scheme where a write buffer is used to log events until a threshold limit is reached. When the threshold limit is reached, the daemon is notified. Once the write buffer has been filled (or the threshold is reached), the trace module assigns the current buffer as the read buffer and uses the previous read buffer as the new write buffer. The daemon subsequently retrieves the data from the current read buffer.

The primary function of the daemon is to retrieve and store the information accumulated by the trace module, typically in a file. The daemon provides the user with a number of options to control the tracing process. In addition to giving the user access to the options available from the trace module, the daemon allows the user specify the tracing duration. Once the daemon is launched, the daemon opens and configures the trace module, and sets a timer if a time duration was specified. Otherwise, the user terminates the daemon process manually to stop the trace.

During normal operation, the daemon typically sleeps, awaiting a signal to read from the trace module, or timer/terminate events to end tracing. Similar to the trace module, the daemon uses double buffering. When the daemon receives a signal from the trace module, the daemon reads the content of the buffer denoted as the read buffer and appends the content to the content in an associated internal buffer (not shown). Once the internal buffer is full, the contents of the internal buffer is committed to a file and, during this process, a second internal buffer is used to record the incoming data.

To enable processing of the event data, conventional tracing frameworks typically require the state information for the software system state prior to performing the trace. Specifically, the daemon reviews one or more system directories and records the following characteristics for each process: 1) process ID (PID); 2) name; and 3) parent's PID (PPID). The state information is typically retrieved after the configuration of the trace module and prior to the start of the trace. The information retrieved is stored in a file that is later used by the analysis software. Unlike the aforementioned components of the conventional tracing framework described above, the data analysis and presentation software is typically run off-line. The software uses both the initial process state and the trace data files created by the daemon to recreate the dynamic behavior of the system in a particular, observed time interval. Collating and sorting utilities with the software are used to display the stored information at the user-level.

SUMMARY

In general, in one aspect, the invention relates to a method for obtaining data from a kernel, comprising obtaining data from the kernel, and storing the data in a data set an aggregation buffer using an aggregation function.

In general, in one aspect, the invention relates to a method for storing data in a data set, wherein the data set comprises a key component, an aggregation identifier component, and a value component, comprising obtaining an expression, a new value, and an aggregation identifier, generating a key using the expression and the aggregation identifier; and storing the data set in a buffer, wherein storing the data set comprises storing the key in the key component, storing the aggregation identifier in the aggregation identifier component, and updating a current value in the value component using the new value and an aggregation function.

In general, in one aspect, the invention relates to a method for integrating data into a user-level table, comprising obtaining a data set from an aggregation buffer, wherein the data set comprises a key component, an aggregation identifier component, and a value component, obtaining an aggregation identifier matching a value of the aggregation identifier in the aggregation identifier component of the data set to obtain a user-level table key, hashing the user-level table key to obtain a generated hash key, updating a value component of a user-level table entry if a user-level table entry a hash key matching the generated hash key is found, wherein updating the value component comprises applying an aggregation function corresponding to the aggregation identifier to the value component using the new value as input, creating a new user-level table entry if a user-level table entry having a hash key matching the generated hash key is not found, wherein creating the new user-level table entry comprises storing the generated hash value, and an initial value in a value component of the new user-level table entry in the new user-level table entry, and updating the value component in the new user-level table entry, wherein updating the value component in the new user-level table entry comprises applying the aggregation function corresponding to the aggregation identifier to the value component in the new user-level table entry using the value component of the data set as input.

In general, in one aspect, the invention relates to a method for integrating data into a user-level table, comprising obtaining a data set from an aggregation buffer, wherein the data set comprises a key component, an aggregation identifier component, and a value component, obtaining an aggregation identifier matching a value of the aggregation identifier in the aggregation identifier component of the data set to obtain a user-level table key, hashing the user-level table key to obtain a generated hash key, updating a value component of a user-level table entry if a user-level table entry a hash key matching the generated hash key is found, wherein updating the value component comprises applying an aggregation function corresponding to the aggregation identifier to the value component using the new value as input, creating a new user-level table entry if a user-level table entry having a hash key matching the generated hash key is not found, wherein creating the new user-level table entry comprises storing the generated hash value, and an initial value in a value component of the new user-level table entry in the new user-level table entry, and updating the value component in the new user-level table entry, wherein updating the value component in the new user-level table entry comprises applying the aggregation function corresponding to the aggregation identifier to the value component in the new user-level table entry using the value component of the data set as input.

In general, in one aspect, the invention relates to a data aggregation buffer comprising a data set, wherein the data set comprises a key component for storing a key, an aggregation identifier component for storing an aggregation identifier component, and a value component for storing a value, a hash chain referencing the key component of the data set using a pointer, and a hash bucket organizing the hash chain.

In general, in one aspect, the invention relates to a data aggregation system comprising an aggregation buffer associated with a central processing unit, a user-level buffer operatively connected to the aggregation buffer and arranged to copy a data set from the aggregation buffer, and a user-level hash table storing a portion of the data set from the user-level buffer using a user-level dictionary, wherein the user-level dictionary provides a reference into the user-level hash table.

In general, in one aspect, the invention relates to an apparatus for obtaining data from a kernel, comprising means for obtaining data from a kernel, a tracing framework, and means for storing the data in a data set in the tracing framework, wherein the tracing framework comprises an aggregation buffer associated with a central processing unit, a user-level buffer operatively connected to the aggregation buffer copying the data set from the aggregation buffer, and a user-level hash table storing a portion of the data set from the user-level buffer using a user-level dictionary, wherein the user-level dictionary provides a reference into the user-level hash table.

In general, in one aspect, the invention relates to a computer system on a network obtaining data from a kernel comprising a processor, a memory, a storage device, and software instructions stored in the memory for enabling the computer system to obtaining data from the kernel, and storing the data in a data set an aggregation buffer using an aggregation function.

Other aspects of the invention will be apparent from the following description and the appended claims.

DETAILED DESCRIPTION

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The invention relates to an apparatus and method for a tracing framework. More specifically, the invention relates to a method and apparatus for aggregating data in a tracing framework.

When analyzing a system to answer performance-related questions, thinking in terms of what data was gathered by individual probes is not as useful as how that data can be aggregated to answer a specific question. For example, if a user wishes to know the number of system calls by user ID, the user is not necessarily concerned about the datum collected at each system call; rather, the user simply wants to see a table of user IDs and system calls. These types of inquiries may be readily supplied using data aggregation.

An aggregation is a function that may be defined to have the following property: $f(f(x_0) \cup f(X_1) \cup \ldots \cup f(x_n)) = f(x_0 \cup X_1 \cup \ldots \cup x_n$, where $x_n$ is a set of arbitrary data. That is, applying an aggregating function to subsets of the whole and then again applying the function to the results gives the same result as applying the function to the whole itself.

This principle is demonstrated by the following example. Take a function SUM that, given a set of data, yields the summation of that set. If the raw data consists of $\{2, 1, 2, 5, 4, 3, 6, 4, 2\}$, the result of applying SUM to the entire set is $\{29\}$. Similarly, the result of applying SUM to the subset consisting of the first three elements is $\{5\}$, the result of applying SUM to the set consisting of the subsequent three elements is $\{12\}$, and the result of applying SUM to the remaining three elements is also $\{12\}$. SUM is an aggregating function because applying the function to the set of these results, $\{5, 12, 12\}$, yields the same result—{29}—as applying SUM to the original data. While not all functions may be classified as aggregation functions, many common functions for understanding a set of data are aggregating functions. These include, but are note limited to: counting the number of elements in the set; computing the minimum value of the set; computing the maximum value of the set; and summing all elements in the set. Further, note that determining the arithmetic mean of the set can be trivially built on functions to count the number, of elements in the set and to sum the number the elements in the set.

Figure 1:
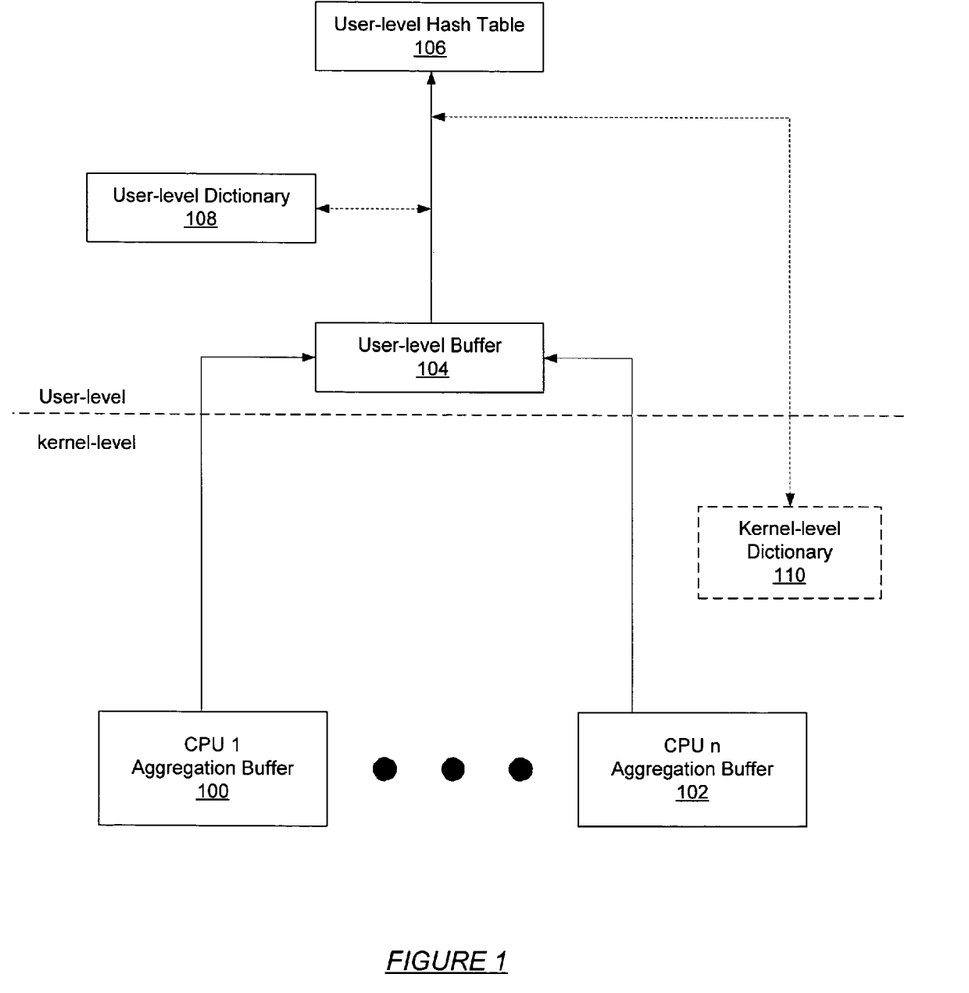
FIG. 1 shows a tracing framework architecture in accordance with one embodiment of the invention.

FIG. 1 shows a tracing framework architecture in accordance with one embodiment of the invention. The tracing framework includes central processing unit ("CPU") aggregation buffers (100, 102) associated with each CPU (i.e., CPU 1 Aggregation Buffer and CPU n Aggregation Buffer). The CPU aggregation buffers (100, 102) may be mapped one-to-one with the CPUs within a system, mapped one-to-many (i.e., one CPU aggregation buffer for more than one CPU), or mapped many-one (i.e., multiple CPU aggregations buffers to one CPU). Data stored in the CPU aggregation buffers (100, 102) is periodically copied from the CPU aggregation buffers (100, 102) to a user-level buffer (104). Once the data from the CPU aggregation buffers (100, 102) has been copied to the user-level buffer (104), the corresponding CPU aggregation buffer (100, 102) from which the data was obtained is typically purged to remove the copied aggregation data. Alternatively, the data in the CPU aggregation buffer (100, 102) may be simply overwritten.

Figure 6:
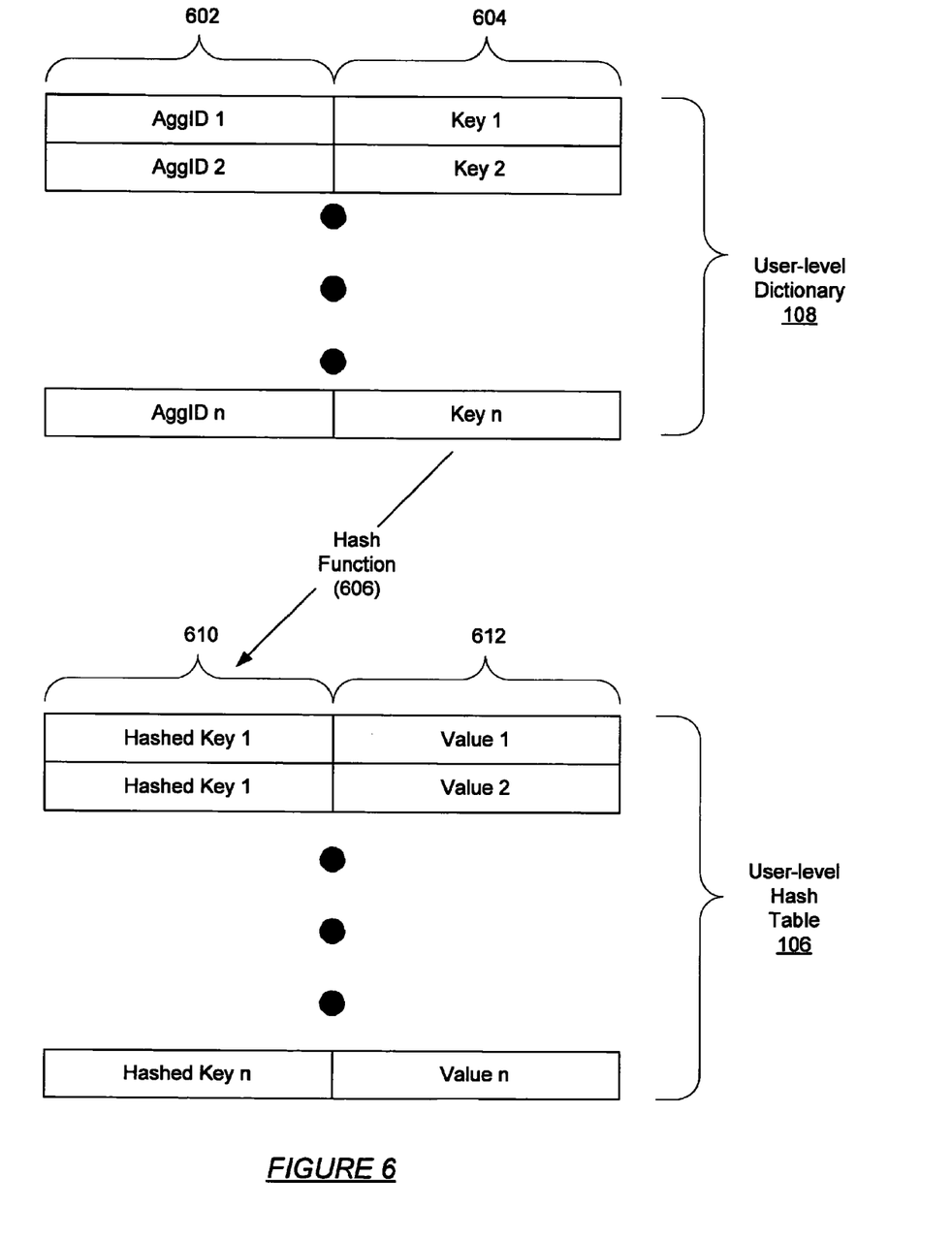
FIG. 6 shows user-level data stores in accordance with one embodiment of the invention.

The user-level buffer (104) temporarily stores the data obtained from each of the CPU aggregation buffers (100, 102). The data stored in the user-level buffer (104) is subsequently transferred to a user-level hash table (106). The user-level hash table (106) uses the data (or portions of the data) stored in the user-level buffer (104) to update the value components of the various aggregations. For example, using the SUM example from above, the current value of the value component of a SUM aggregation in the user-level hash table (106) may be {5}, and an intermediate value of the SUM aggregation from the user-level buffer may be {12}. The value of the value component in the SUM aggregation in the user-level hash table (206) is then updated using the intermediate value to obtain an updated value of {17}. The values of the various value components corresponding to the various aggregations (i.e., processes executing in the tracing framework that are using aggregation functions in accordance with one or more embodiments of the invention) in the user-level hash table (106) are then updated using a user-level dictionary (108) and/or a kernel-level dictionary (110). The user-level dictionary (108) and the kernel-level dictionary (110) provide indexes into the user-level hash table (106). Refer to FIG. 6 below for a discussion of the user-level dictionary (108) and the user-level hash table (106).

Figure 2:
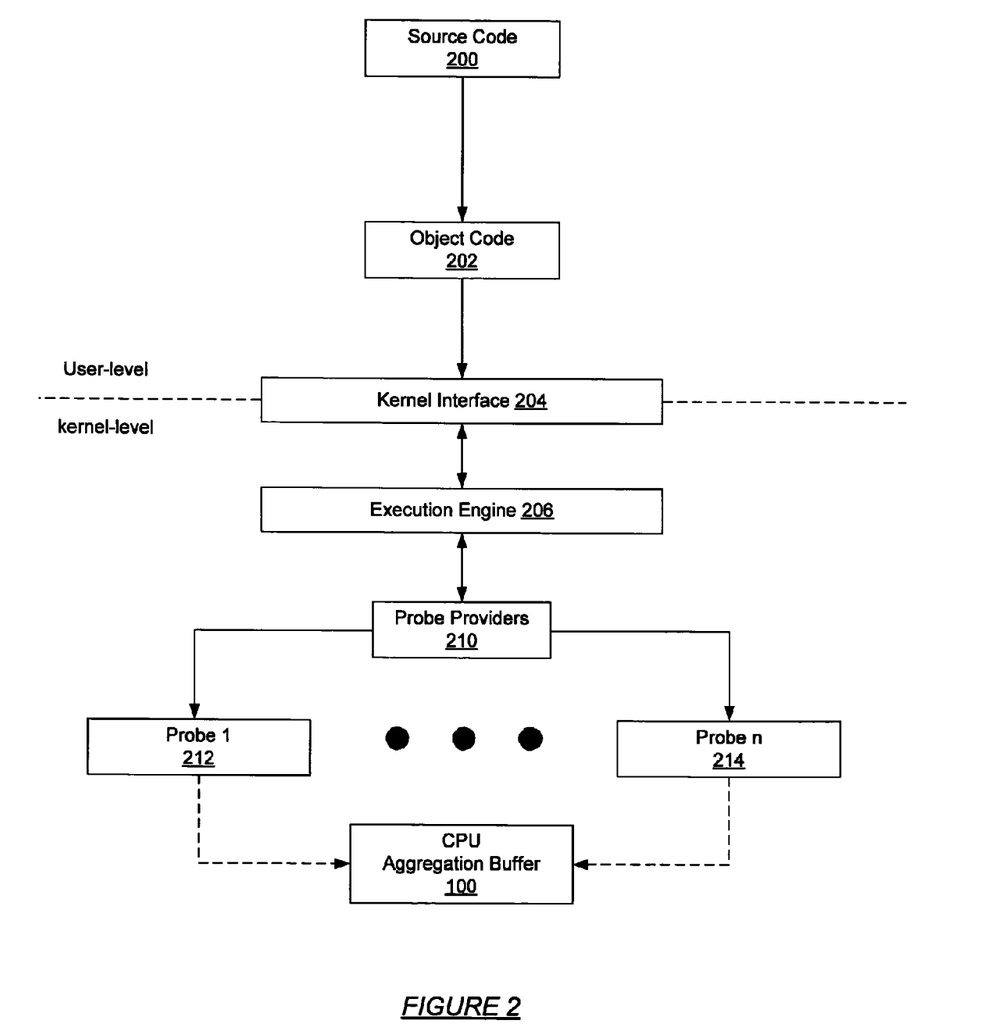
FIG. 2 shows a flow diagram detailing the collection of aggregation data in accordance with one embodiment of the invention.
Figure 3:
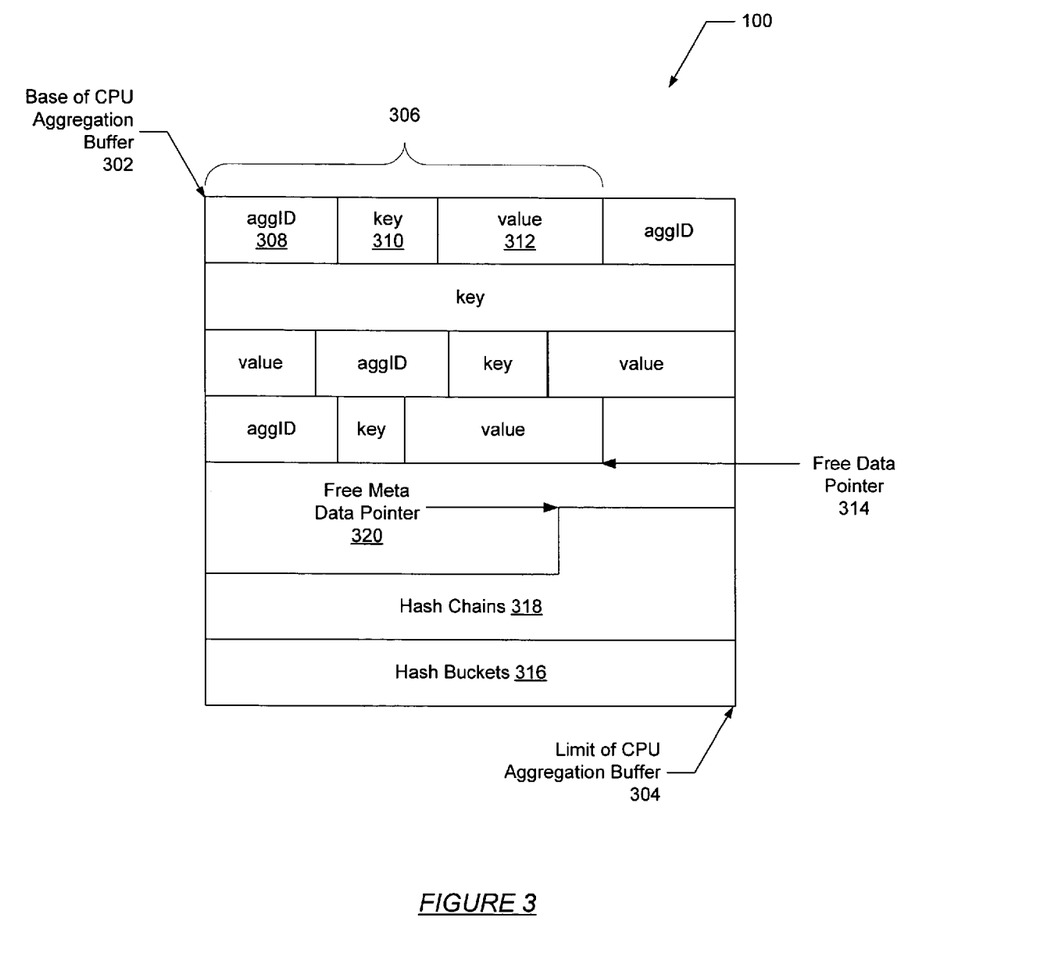
FIG. 3 shows a buffer layout in accordance with one embodiment of the invention.

FIG. 2 shows a flow diagram detailing the collection of aggregation data in accordance with one embodiment of the invention. Specifically, FIG. 2 provides an overview of the process for providing data for the CPU aggregation buffers (100, 102). Initially, source code (200) is written/obtained/generated that defines the aggregation (i.e., processes executing in the tracing framework that are using aggregation functions in accordance with one or more embodiments of the invention).

The source code (200) is subsequently compiled to generate executable object code (202). The object code (202) is then communicated to a kernel-level execution engine (206) via a kernel interface (204). The execution engine (206) includes functionality to execute the object code (202). Specifically, the execution engine (206) interprets the object code (202) and directs the probe providers (210) to activate certain probes (212, 214) within target code (i.e., the program which is to be instrumented). The probes (212, 214) gather the specified information, as defined by the object code (202), and forward the information (directly or indirectly) to a corresponding CPU aggregation buffer (100, 102). The CPU aggregation buffer (100, 102), or a related process, analyzes the information and stores the information as a data set. An embodiment of the data set is described below with respect to FIG. 3.

The following description describes one embodiment for defining an aggregation. The source code syntax "name [expressions]=aggfunc (args)" corresponds to a generic syntax for defining an aggregation in accordance with the tracing framework architecture shown in FIG. 1. Specifically, the "name" portion corresponds to the name assigned to the aggregation. The "name" portion is typically an ASCII string written in a user-readable form. The "expressions" portion corresponds to a comma-separated list of pre-defined expressions that are used in the storage and display of the data sets. Typically, the "expressions" are predefined in the kernel. The "aggfunc" corresponds to an aggregation function, as described above. The "args" portion corresponds to a comma-separated list of arguments required by the particular aggregation function specified in the "argfunc" portion of the source code syntax.

The following are examples of source code segments based on the syntax defined above to define specific aggregations. The first code segment "@count [execname]=count ( )" defines an aggregation having a user specified name "count." The aggregation function used in the code segment is "count ( )," which determines the number of times a particular process is called. In this example, the count function does not include any additional arguments ("args"). The aggregation data obtained using the count aggregation function is stored and displayed with respect to the defined expression (or process) name (i.e., "execname").

The second code segment "@time [execname]=avg(timestamp-self->ts)" defines an aggregation function having a user defined name "time." The aggregation function used in the code segment is "avg," which determines the arithmetic average of the specified expressions. Unlike the "count" function, the "avg" function requires additional arguments. Specifically, the "avg" function requires the user to specify what property of the expression the user intends to average. In this particular code segment, the user intends to determine the average time spent using the write system call, by process name. In this case, the wall time spent in the system call, which is defined by the argument "timestamp-self->ts," is averaged. The aggregation data obtained using the "avg" aggregation function is subsequently stored and displayed with respect to the defined expression (or process) name (i.e., "execname").

Table 1 provides a summary of some common aggregation functions. This list is not exhaustive, and is not intended to limit the scope of the invention.

TABLE 1

Example of Aggregation Functions

| Function Name | Arguments | Result |
|---|---|---|
| count | None | The number of times called. |
| sum | Scalar expression | The total value of the specified expressions. |

TABLE 1-continued

Example of Aggregation Functions

| Function Name | Arguments | Result |
|---|---|---|
| avg | Scalar expression | The arithmetic average of the specified expressions. |
| min | Scalar expression | The smallest value among the specified expressions. |
| max | Scalar expression | The largest value among the specified expressions. |
| lquantize | Scalar expression, lower bound, upper bound, step value | A linear frequency distribution, sized by the specified range, of the values of the specified expressions. Increments the value in the highest bucket that is less than the specified expression. |
| quantize | Scalar expression | A power-of-two frequency distribution of the values of the specified expressions. Increments the value in the highest power-of-two bucket that is less than the specified expression. |

Figure 4:
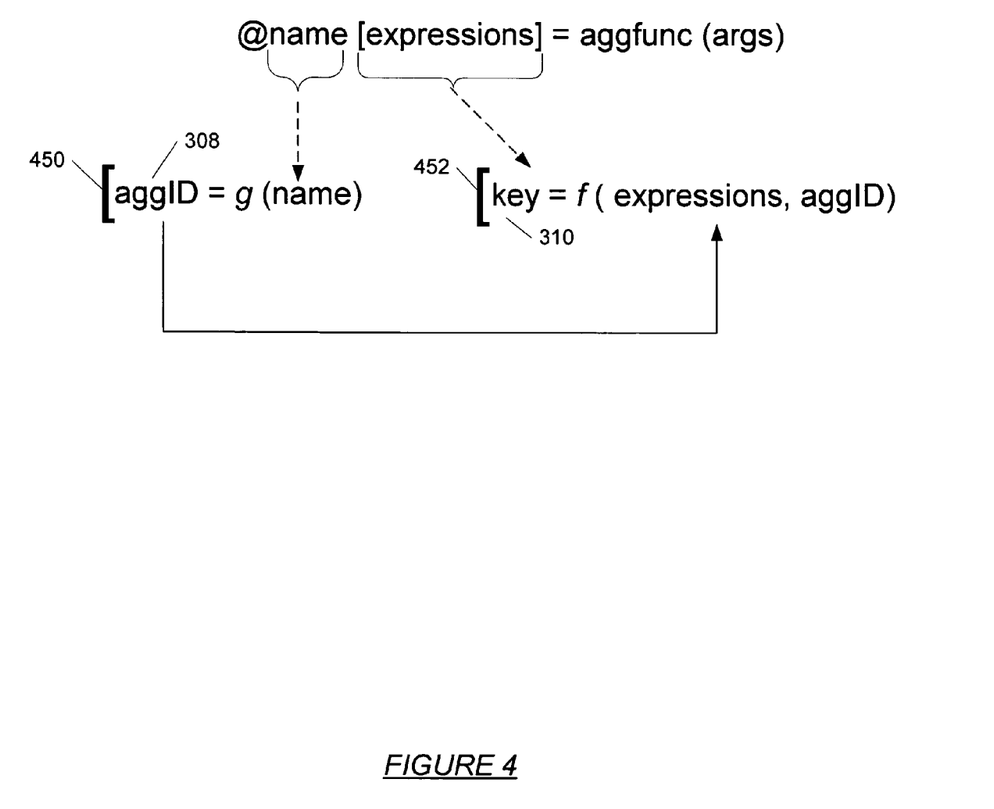
FIG. 4 shows a portion of source code syntax in accordance with one embodiment of the invention.

FIG. 3 shows a CPU aggregation buffer layout in accordance with one embodiment of the invention. The CPU aggregation buffer (100, 102) is delimited in the cache (not shown) by an address denoting the base of the CPU aggregation buffer (302) and the limit of the CPU aggregation buffer (304). In one or more embodiments of the invention, the data stored in the CPU aggregation buffer (100, 102)), is organized as a data set (306). The data set (306) may include several components including, but not limited to: 1) an aggregation identifier ("aggID") (308) component; 2) a key (310) component; and 3) a value (312) component. In one embodiment of the invention, as shown in FIG. 4, the aggID (308) component is an integer derived by applying a function to the "name" portion of the syntax for defining an aggregation (450). Further, the key (310) component may be derived by a applying a function to the aggID (308) and the "expressions" portion of the syntax for defining an aggregation (452).

Returning to FIG. 3, the key (310) component provides a reference into the CPU aggregation buffer (100, 102). The value (312) component corresponds to the current value of a particular portion of a particular aggregation for the CPU in question. For example, using the count example from above, the value (312) component may correspond to the number of times a grep function has been called by the kernel.

In one embodiment of the invention, the data set (306) is stored in the buffer starting at the base of the CPU aggregation buffer (302). New data sets are added to the CPU aggregation buffer (100, 102) at the location denoted by a free data pointer (314). The CPU aggregation buffer (100, 102) also includes hash buckets (516) and hash chains (518) which provide a means for efficiently accessing the data in the CPU aggregation buffer (100, 102). An embodiment of the hash buckets (316) and hash chains (318) is detailed in FIG. 5. New hash chains (318) are added to the CPU aggregation buffer (100, 102) at a location denoted by a free metadata pointer (320).

Figure 5:
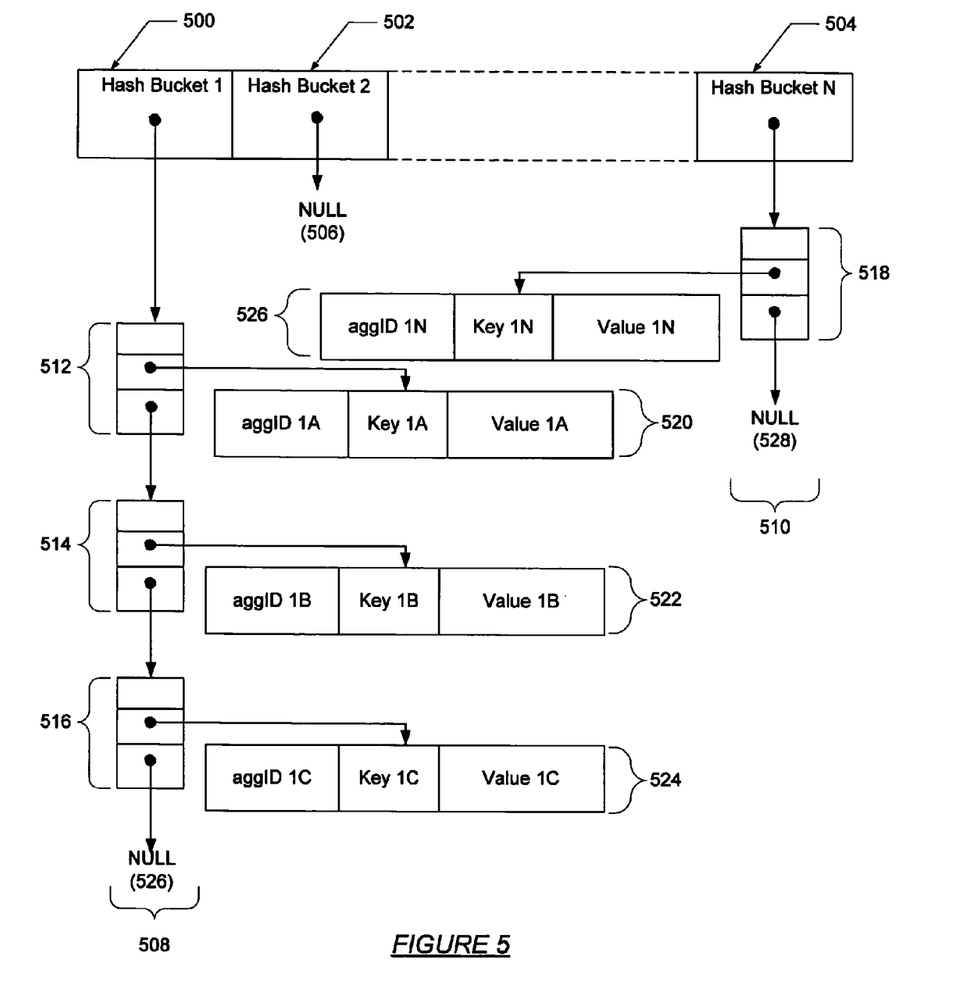
FIG. 5 shows a detailed view of a portion of a buffer layout in accordance with one embodiment of the invention.

FIG. 5 shows a detailed view of a portion of a CPU aggregation buffer layout in accordance with one embodiment of the invention. The CPU aggregation buffer (100, 102) may include any number of hash buckets (500, 502, 504). The number of hash buckets (500, 502, 504) may be optimized to provide the most efficient access into the CPU aggregation buffer (100, 102). Each hash bucket (500, 502, 504) is either associated directly with a NULL pointer (506) signifying that no hash chains (508, 510) are associated with that particular hash bucket (500, 502, 504), or with a hash chain (508, 510) having one or more hash chain elements (512, 514, 516, 518) and terminating with a NULL pointer (526, 528).

Each hash chain element (512, 514, 516, 518) points to a component of the data set (520, 522, 524, 526). In one embodiment of the invention, hash chain elements (512, 514, 516, 518) are indexed to point to the key (310) component (e.g., Key 1A, Key 1B, Key 1C, Key 1N) in the data sets (520, 522, 524, 526). In addition, each hash chain element (512, 514, 516, 518) includes a pointer to the next hash chain element (512, 514, 516, 518), and the last hash chain element (516, 518) in a given hash chain (508, 510) is linked to a NULL pointer (526, 528).

As noted above in FIG. 1, the values of the various aggregations in the user-level hash table are updated using a user-level dictionary and/or a kernel-level dictionary. The user-level dictionary and the kernel-level dictionary provide indexes into the user-level hash table. FIG. 6 shows a detailed view of the user-level data stores in accordance with one embodiment of the invention. The user-level dictionary (108) includes a table indexing aggIDs (602) with a corresponding key value (604). A hash function (606) may then be applied to the key value (604) (i.e., Key 1, Key 2, Key n) to provide an index into the user-level hash table (106).

The user-level hash table (106) includes a table indexing a hashed key (610) with a corresponding value (612). The value (i.e., Value 1, Value 2, Value n) corresponds to the value of the value component of a particular portion of the aggregation calculated using information obtained from the most recently analyzed CPU aggregation buffer (100, 102).

Figure 7:
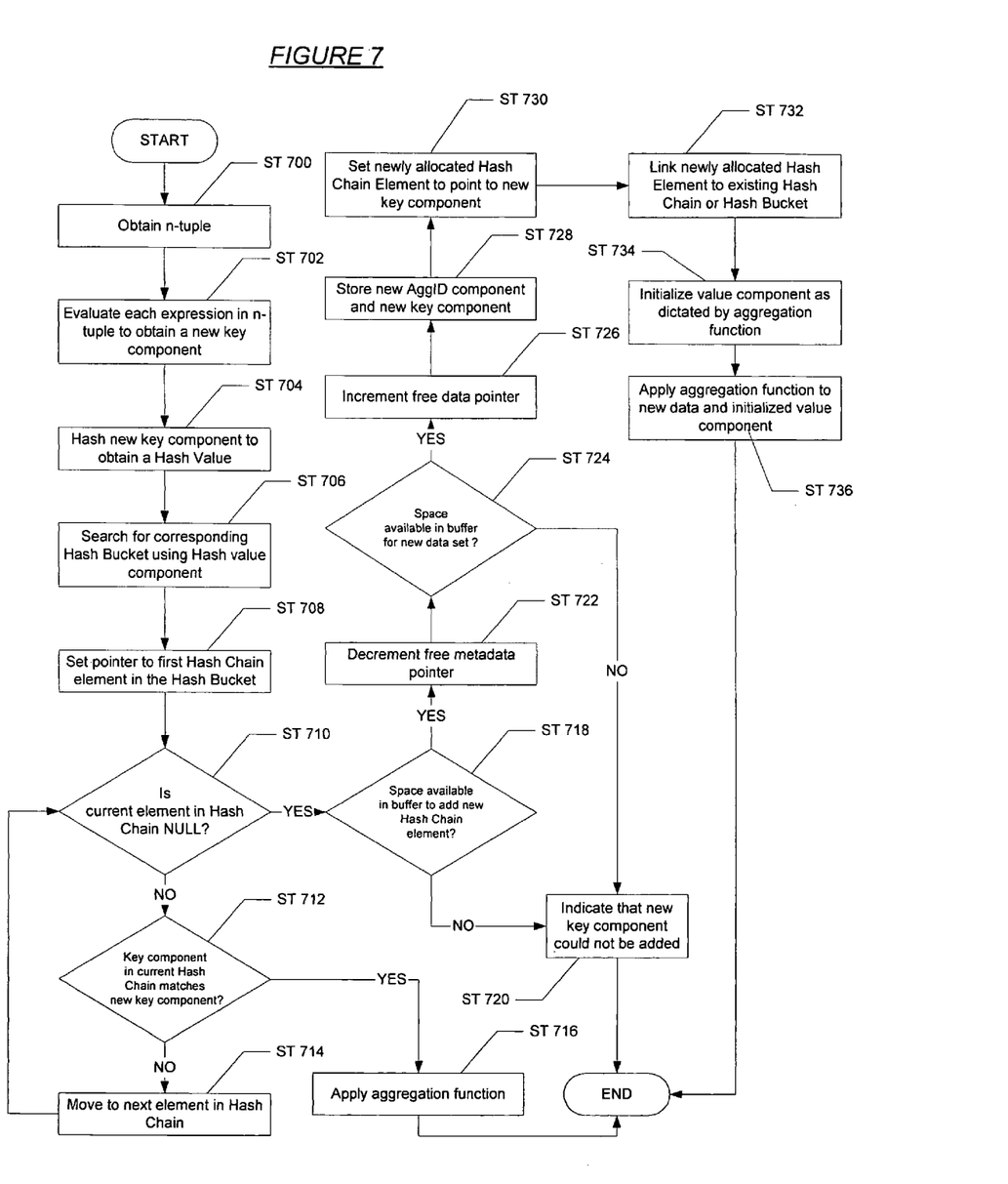
FIG. 7 shows a flowchart in accordance with one embodiment of the invention.

FIG. 7 shows a flowchart in accordance with one embodiment of the invention. The flowchart describes how a data set is stored in a CPU aggregation buffer (100, 102), in accordance with one embodiment of the invention. Initially, an n-tuple is obtained (Step 700). The n-tuple typically includes data obtained from the probes (e.g., 212, 214). In one embodiment of the invention, the n-tuple includes the list of expressions and the aggID (308) component. The n-tuple is subsequently evaluated to obtain a key (310) component (Step 702). The process to evaluate the n-tuple is shown in FIG. 4, and described in the text describing FIG. 4 above. A hash function is then applied to the key (310) component to obtain a hash value (Step 704). The hash buckets (316) in the CPU aggregation buffer (100, 102) are subsequently searched to determine a hash bucket (316) that includes/corresponds to the hash value (Step 706). A search pointer is then set to the first element in the corresponding hash bucket (316), as determined in the previous step (Step 708).

Next, the first element in the hash chain (316) is evaluated to determine whether the first element is a NULL pointer (Step 710). If the first element in the hash chain (318) is not a NULL pointer, then the first element is evaluated to determine whether the key (310) component at the first element matches the key (310) component generated in Step 702 (Step 712). If the key (310) component in the first element matches the key (310) component generated in Step 702, then the corresponding aggregation function (as specified by the aggID (308) component) is applied to the value (312) component in the data set (306) (Step 716). The aggregation function is applied by using the new value obtained from the probes (e.g., 212, 214) to obtain an updated value for the value (312) component in the data set (306). If the key (310) component in the first element does not match the key (310) component generated in Step 702, then the search pointer is incremented to the next element in the hash chain (Step 714), and steps 710-712 are repeated until a matching key (310) component is found or until a NULL pointer is encountered.

If a NULL pointer is encountered, the CPU aggregation buffer (100, 102) is evaluated to determine whether enough space exists in the CPU aggregation buffer (100, 102) to add a new hash chain element (Step 718). If no space is available, then a per-CPU counter indicating that no space is available is incremented (Step 720). If sufficient space is available in the CPU aggregation buffer (100, 102), then the free metadata pointer (320) is decremented (Step 722). The CPU aggregation buffer (100, 102) is subsequently evaluated to determine whether space is available to add the new data set (306) (i.e., a new aggID component, new key component, and new value component) (Step 724). If no space is available, then a per-CPU counter indicating that no space is available is incremented (Step 720). If sufficient space is available, then the free data pointer (314) is incremented (Step 726).

The aggID (308) component and key (310) component (obtained/generated in Step 702) are subsequently stored in the CPU aggregation buffer (100, 102) (Step 728). A new hash chain element is subsequently created and a pointer is allocated to point from the hash chain element to the key component stored in step 728 (Step 730). The new hash chain element is then linked to either an existing hash chain (318) or a hash bucket (516) (Step 732). Next, a value (312) component associated with the aggID (308) component is initialized according the aggregation function identified by the aggID (308) component (Step 734). The aggregation function corresponding to the aggID (308) component is subsequently applied using the initialized value and the value obtained from the probes (e.g., 212, 214 in FIG. 2) (Step 736).

Those skilled in the art will appreciate that the more frequently the CPU aggregation buffers (100) are integrated into the user-level hash table (106), the smaller the likelihood that the per-CPU counter tracking the occurrence of insufficient space (i.e., Step 720) is needed. Further, the rate of integration of the data into the user-level hash table (106) and the size of the CPU aggregation buffer (100, 102) are tunable by the user.

Further, data may be simultaneously stored in multiple CPU aggregation buffers (100, 102) throughout the system. Periodically, the data in the CPU aggregation buffers (100, 102) may be transferred from to a user-level buffer (104) and subsequently integrated into a user-level hash table (106).

Figure 8:
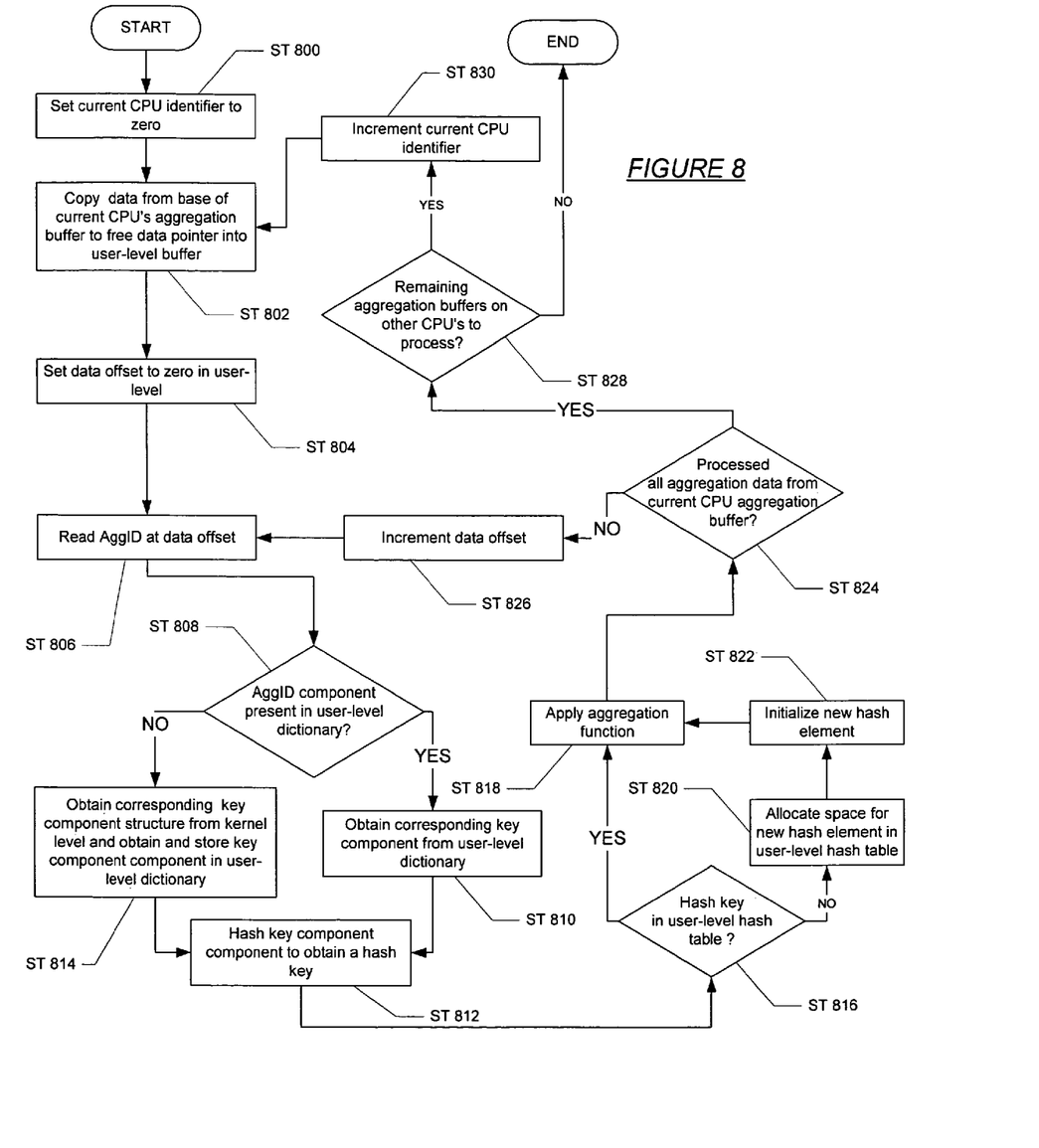
FIG. 8 shows a flowchart in accordance with one embodiment of the invention.

FIG. 8 shows a flowchart in accordance with one embodiment of the invention. The flowchart describes how a data set from a CPU aggregation buffer (100, 102) is incorporated into the user-level hash table ("user-level table") (106) in accordance with one embodiment of the invention. Initially, the current CPU identifier (i.e., a variable keeping track of the current CPU number) is set to zero (Step 800). The contents of the CPU aggregation buffer (100, 102) located in the CPU that corresponds to the value of the current CPU identifier is then copied into a user-level buffer (Step 802). The contents is copied from the base of the CPU aggregation buffer (100, 102) to the free data pointer (314) in the CPU aggregation buffer (100, 102). At the user-level, the data offset (into the user-level buffer) is set to zero (Step 804). The aggID (308) component at the data offset (Step 806) is subsequently evaluated to determine if the aggID (308) component is present in the user-level dictionary (108) (Step 808). If the aggID (308) component is present in the user-level dictionary (108), then a corresponding key (310) component is obtained from the user-level dictionary (108) (Step 810). Alternatively, if the aggID (308) component is not present in the user-level dictionary (108), then a corresponding key structure may be obtained from a kernel level dictionary (110) and used to determine the key (310) component. The key (310) component is subsequently stored in the user-level dictionary (108) (Step 814). The key structure includes the size of the key (310) component and identifies aggregation function. The size of the key (310) component is used to determine the portion of the data set (506) copied from the CPU aggregation buffer (100, 102) that corresponds to the key (310) component.

The key (310) component (however obtained) is then hashed to obtain a hash key (812). A user-level hash table (108) is then evaluated to determine the presence of the hash key (Step 816). If the hash value is present in the user-level hash table (108), then the corresponding aggregation function (as specified by the aggID) is applied to the value component (612) using the value (312) component obtained from the CPU aggregation buffer (100, 102), to obtain an updated value for the value component (612) in the user-level hash table (106) (Step 818). If the hash value is not present in the user-level hash table (106), then space is allocated for a new hash element (Step 820). The value component (612) in the user-level hash table (106) is subsequently initialized as dictated by the aggregation function (Step 822). The type of aggregation function may be obtained from the aggID (308) component. The corresponding aggregation function (as specified by the aggID (308) component) is then applied to the value (312) component obtained from the CPU aggregation buffer (100, 102) and the initialized value of the value component (612) in the user-level hash tale (106). The result of applying the aggregation function is obtaining an updated value for the value component (612) in the user-level hash table (106) (Step 818).

Once the value component (612) in the user-level hash table (106) has been updated, the user-level buffer (104) is evaluated to determine whether all the data in the user-level buffer has been processed (Step 824). If unprocessed data is remaining in the user-level buffer (104), then the data offset is incremented to the next aggID (310) component (Step 826) and Steps 806-824 are repeated. If no unprocessed data remains in the user-level buffer (104), then the CPU identifier is evaluated to determine whether any remaining unprocessed CPU aggregation buffers (100, 102) exist (Step 828). If unprocessed CPU aggregation buffers (100, 102) remain, then the current CPU identifier is incremented (Step 830) and Steps 802-828 are repeated.

The contents of the user-level hash table (106) may then be displayed to the user. The data may be formatted and displayed using traditional display functions and techniques. The following is an example of output obtained using the count example described above.

| Sample Output | |
|---|---|
| dtrace | 1 |
| cat | 4 |
| sed | 9 |
| head | 9 |
| grep | 14 |
| find | 15 |
| tail | 25 |
| mountd | 28 |
| expr | 72 |
| sh | 291 |
| tee | 814 |
| def.dir.flp | 1996 |
| make.bin | 2010 |

The invention, as described in the various example embodiments above, provides a means for applying aggregating functions to data in situ. For example, aggregating functions allow intermediate results to be kept per-CPU instead of in a shared data structure. When a system-wide result is desired, the aggregating function may then be applied to the set including the per-CPU intermediate results.

In addition, the entire data set need not be stored. Whenever a new element is to be added to the set, the aggregating function is calculated using the current intermediate result and the new element. After the new result is calculated, the new element may be discarded. This reduces the amount of storage required by a factor of the number of data points, which is often quite large. In addition, the invention provides a scalable solution for the collection and analysis of aggregation data.

Figure 9:
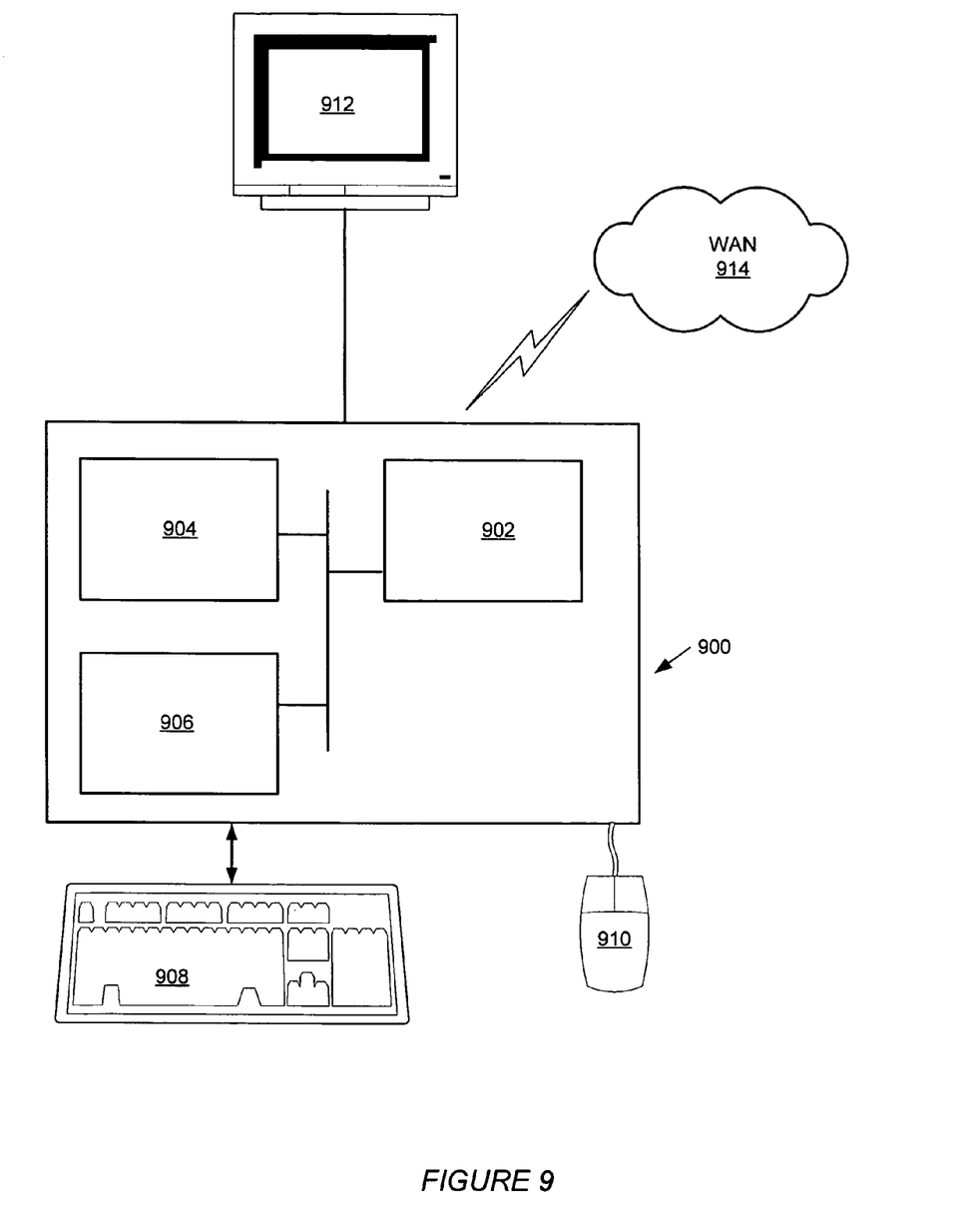
FIG. 9 shows a networked computer system in accordance with one embodiment of the invention.

The invention may be implemented on virtually any type of computer regardless of the platform being used. For example, as shown in FIG. 9, a typical networked computer system (900) includes a processor (902), associated memory (904), a storage device (906), and numerous other elements and functionalities typical of today's computers (not shown). The networked computer (900) may also include input means, such as a keyboard (908) and a mouse (910), and output means, such as a monitor (912). The networked computer system (900) is connected to a local area network (LAN) or a wide area network (914) (e.g., the Internet) via a network interface connection (not shown). Those skilled in the art will appreciate that these input and output means may take other forms. Those skilled in the art will appreciate that one or more elements of the aforementioned computer (900) may be located at a remote location and connected to the other elements over a network.

Those skilled in the art will appreciate that any means for obtaining data from the kernel may used in conjunction with invention. For example, data may be obtained from the kernel using kernel statistic utilities, activated probes in the kernel, additional hooks into the kernel, etc. Further, those skilled in the art will appreciate that means for storing the data in a data set in a tracing framework may be implemented in a number of different way including, but not limited to, using an array data structure, using a record data structure, using a linked list data structure, using a hash table data structure, such as the one described in FIG. 5, etc.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A method for obtaining trace data from a kernel comprising a plurality of probes, the method comprising:
obtaining first trace data from the kernel using one of the plurality of probes, wherein the first trace data comprises a first trace value and a first aggregation identifier that identifies a first aggregation function, and wherein obtaining the first trace data from the kernel comprises: obtaining an expression, the first trace value, and the first aggregation identifier, and generating a key using the expression and the first aggregation identifier;
applying the first aggregation function to the first trace value to obtain a first aggregation result;
storing the first aggregation result in a first data set of a first aggregation buffer, wherein the first aggregation buffer is associated with a first central processing unit, wherein storing the first aggregation result in the first data set of the first aggregation buffer comprises: storing the key in a key component of the first data set, storing the aggregation identifier in an aggregation identifier component of the first data set, and updating a value component of the first data set using the first aggregation result;
obtaining second trace data from the kernel using the one of the plurality of probes, wherein the second trace data comprises a second trace value and the first aggregation identifier;
applying the first aggregation function to the second trace value to obtain a second aggregation result;
storing the second aggregation result in a second data set of a second aggregation buffer, wherein the second aggregation buffer is associated with a second central processing unit;
applying the first aggregation function to the first aggregation result and third trace data to obtain a third aggregation result, wherein the third trace data comprises a third trace value and the first aggregation identifier;
in response to storing the third aggregation result in a user-level buffer, removing the first aggregation result from the first aggregation buffer;
applying the first aggregation function to the second aggregation result to obtain a fourth aggregation result; and
in response to storing the fourth aggregation result in the user-level buffer, removing the second aggregation result from the second aggregation buffer.

2. The method of claim 1, further comprising:
obtaining fourth trace data from the kernel using one of the plurality of probes, wherein the fourth trace data comprises a fourth trace value and a second aggregation identifier that identifies a second aggregation function;
applying the second aggregation function to the fourth trace value to obtain a fifth aggregation result;
storing the fifth aggregation result in a third data set of the first aggregation buffer;
applying the second aggregation function to the fifth aggregation result and fifth trace data to obtain a sixth aggregation result, wherein the fifth trace data comprises a fifth trace value and the second aggregation identifier; and
in response to storing the sixth aggregation result in the user-level buffer, removing the fifth aggregation result from the first aggregation buffer.

3. The method of claim 1, further comprising:
using the first aggregation identifier to obtain a user-level table key of a user-level table;
hashing the user-level table key to obtain a generated hash key;
updating a value component of a user-level table entry if a user-level table entry having a hash key matching the generated hash key is found, wherein the value component is updated using the third aggregation result;
creating a new user-level table entry if a user-level table entry having a hash key matching the generated hash key is not found, wherein creating the new user-level table entry comprises storing the generated hash value, and an initial value in a value component of the new user-level table entry in the new user-level table entry; and
updating the value component in the new user-level table entry, wherein the value component is updated using the third aggregation result.

4. The method of claim 3, wherein the user-level table is a hash table.

5. The method of claim 3, wherein the first aggregation identifier is obtained by searching at least one selected from the group consisting of a user-level dictionary and a kernel level dictionary.

6. The method of claim 1, wherein the expression comprises an n-tuple.

7. A method for obtaining trace data from a kernel comprising a plurality of probes, the method comprising:
- obtaining first trace data from the kernel using one of the plurality of probes, wherein the first trace data comprises a first trace value and a first aggregation identifier that identifies a first aggregation function and wherein the first aggregation identifier is generated by applying a function to a user-defined name for an aggregation;
- applying the first aggregation function to the first trace value to obtain a first aggregation result;
- storing the first aggregation result in a first data set of a first aggregation buffer, wherein the first aggregation buffer is associated with a first central processing unit;
- obtaining second trace data from the kernel using the one of the plurality of probes, wherein the second trace data comprises a second trace value and the first aggregation identifier;
- applying the first aggregation function to the second trace value to obtain a second aggregation result;
- storing the second aggregation result in a second data set of a second aggregation buffer, wherein the second aggregation buffer is associated with a second central processing unit;
- applying the first aggregation function to the first aggregation result and third trace data to obtain a third aggregation result, wherein the third trace data comprises a third trace value and the first aggregation identifier;
- in response to storing the third aggregation result in a user-level buffer, removing the first aggregation result from the first aggregation buffer;
- applying the first aggregation function to the second aggregation result to obtain a fourth aggregation result; and
- in response to storing the fourth aggregation result in the user-level buffer, removing the second aggregation result from the second aggregation buffer.

8. The method of claim 7, further comprising:
- obtaining fourth trace data from the kernel using one of the plurality of probes, wherein the fourth trace data comprises a fourth trace value and a second aggregation identifier that identifies a second aggregation function;
- applying the second aggregation function to the fourth trace value to obtain a fifth aggregation result;
- storing the fifth aggregation result in a third data set of the first aggregation buffer;
- applying the second aggregation function to the fifth aggregation result and fifth trace data to obtain a sixth aggregation result, wherein the fifth trace data comprises a fifth trace value and the second aggregation identifier; and
- in response to storing the sixth aggregation result in the user-level buffer, removing the fifth aggregation result from the first aggregation buffer.

9. The method of claim 7, further comprising:
- using the first aggregation identifier to obtain a user-level table key of a user-level table;
- hashing the user-level table key to obtain a generated hash key;
- updating a value component of a user-level table entry if a user-level table entry having a hash key matching the generated hash key is found, wherein the value component is updated using the third aggregation result;
- creating a new user-level table entry if a user-level table entry having a hash key matching the generated hash key is not found, wherein creating the new user-level table entry comprises storing the generated hash value, and an initial value in a value component of the new user-level table entry in the new user-level table entry; and
- updating the value component in the new user-level table entry, wherein the value component is updated using the third aggregation result.

10. The method of claim 9, wherein the user-level table is a hash table.

11. The method of claim 9, wherein the first aggregation identifier is obtained by searching at least one selected from the group consisting of a user-level dictionary and a kernel level dictionary.

12. The method of claim 7, wherein obtaining the first trace data from the kernel comprises:
- obtaining an expression, the first trace value, and the first aggregation identifier, and
- generating a key using the expression and the first aggregation identifier.

13. The method of claim 12, wherein storing the first aggregation result in the first data set of the first aggregation buffer comprises:
- storing the key in a key component of the first data set, storing the aggregation identifier in an aggregation identifier component of the first data set, and updating a value component of the first data set using the first aggregation result.

14. The method of claim 12, wherein storing the first aggregation result in the first data set of the first aggregation buffer comprises:
- generating a hash key using the key;
- searching for a hash bucket corresponding to the key using the hash key;
- searching for a hash chain element in the hash bucket corresponding to the key;
- updating a value component of the first data set associated with the hash chain element if a hash chain element corresponding to the key is found, wherein the value component is updated using the first aggregation result;
- creating a new hash chain element if the hash chain element corresponding to the key is not found, wherein creating a new hash chain element comprises associating the first data set with the new hash chain element, storing the key in a key component of the first data set, storing the aggregation identifier in an aggregation identifier component of the first data set, and storing an initial value in the value component of the first data set; and
- updating the value component associated with the new hash chain element, wherein the value component is updated using the first aggregation result.

15. The method of claim 14, wherein the hash chain element is associated with the first data set using a pointer.

16. The method of claim 14, wherein the new hash chain element is associated with the first data set using a pointer.

17. The method of claim 12, wherein the expression comprises an n-tuple.

* * * * *